US012730870B2

(12) United States Patent
Fudemoto et al.

(10) Patent No.: US 12,730,870 B2
(45) Date of Patent: Sep. 8, 2026

(54) AUTHENTICATION SYSTEM, AUTHENTICATION METHOD, AND COMPUTER READABLE MEDIUM

(71) Applicant: NEC Corporation, Tokyo (JP)

(72) Inventors: Kunio Fudemoto, Tokyo (JP); Nobuaki Kawase, Tokyo (JP); Takeshi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 18/845,538

(22) PCT Filed: Mar. 29, 2022

(86) PCT No.: PCT/JP2022/015325
§ 371 (c)(1),
(2) Date: Sep. 10, 2024

(87) PCT Pub. No.: WO2023/187960
PCT Pub. Date: Oct. 5, 2023

(65) Prior Publication Data

US 2025/0190529 A1 Jun. 12, 2025

(51) Int. Cl.
*G06F 21/32* (2013.01)

(52) U.S. Cl.
CPC .................................. *G06F 21/32* (2013.01)

(58) Field of Classification Search
CPC ...................................................... G06F 21/32
See application file for complete search history.

(56) References Cited

U.S. PATENT DOCUMENTS

2010/0262572 A1* 10/2010 Cheng ...................... G06N 5/02 715/848
2011/0135168 A1 6/2011 Hosoi
2015/0358316 A1* 12/2015 Cronin ................ H04L 63/0861 726/6
2015/0379254 A1* 12/2015 Matsuda ................ G06V 40/70 726/19

(Continued)

FOREIGN PATENT DOCUMENTS

JP 2010-218060 A 9/2010
JP 2015-130155 A 7/2015

(Continued)

OTHER PUBLICATIONS

International Search Report for PCT Application No. PCT/JP2022/015325, mailed on Jul. 5, 2022.

(Continued)

*Primary Examiner* — Khoi V Le
(74) *Attorney, Agent, or Firm* — Sughrue Mion, PLLC

(57) ABSTRACT

An authentication system (1) is a system for authenticating a predetermined group. The authentication system (1) includes an authentication unit (11) and a condition setting unit (12). The authentication unit (11) performs biometric authentication of a person on the basis of a predetermined personal authentication criterion. The condition setting unit (12) sets a group authentication condition for another member in the group to which the person belongs on the basis of attribute information of the authenticated person. The authentication unit (11) authenticates another member on the basis of the set group authentication condition.

20 Claims, 14 Drawing Sheets

(56) References Cited

U.S. PATENT DOCUMENTS

2023/0360101 A1 11/2023 Yuki

FOREIGN PATENT DOCUMENTS

| | | | |
|---|---|---|---|
| JP | 2016-148998 | A | 8/2016 |
| JP | 2018-005574 | A | 1/2018 |
| JP | 2019-057004 | A | 4/2019 |
| JP | 2020-088462 | A | 6/2020 |
| JP | 2020-154737 | A | 9/2020 |
| JP | 2020-160573 | A | 10/2020 |
| WO | 2021/199114 | A1 | 10/2021 |
| WO | 2021/256099 | A1 | 12/2021 |
| WO | 2022/003888 | A1 | 1/2022 |

OTHER PUBLICATIONS

JP Office Action for JP Application No. 2024-510769, mailed on Oct. 21, 2025 with English Translation.

* cited by examiner

341

| PERSON ID | GROUP ID | GROUP REPRESENTATIVE FLAG | GROUP ATTRIBUTE | AGE | GENDER | · · · |
|---|---|---|---|---|---|---|
| 0011 | G01 | 1 | FAMILY | 36 | MALE | |
| 0012 | G01 | 1 | FAMILY | 34 | FEMALE | |
| 0013 | G01 | 0 | FAMILY | 5 | MALE | |
| 0014 | G01 | 0 | FAMILY | 3 | FEMALE | |
| ⋮ | ⋮ | ⋮ | ⋮ | ⋮ | ⋮ | |

Fig. 6

| REPRESENTATIVE MEMBER AUTHENTICATION SCORE X1 | AUTHENTICATION THRESHOLD X2 FOR ANOTHER MEMBER |
|---|---|
| $0.7 \leqq X1 \leqq 1.0$ | $0.4 \leqq X2$ |
| $0.6 \leqq X1 < 0.7$ | $0.6 \leqq X2$ |

Fig. 7

AUTHENTICATION SYSTEM, AUTHENTICATION METHOD, AND COMPUTER READABLE MEDIUM

This application is a National Stage Entry of PCT/JP2022/015325 filed on Mar. 29, 2022, the contents of all of which are incorporated herein by reference, in their entirety.

TECHNICAL FIELD

The present disclosure relates to an authentication system, an authentication method, and a computer readable medium.

BACKGROUND ART

There is a demand for efficiently authenticating a group including a plurality of persons in a predetermined passage gate with authentication.

For example, an image processing apparatus disclosed in Patent Literature 1 stores registered images grouped for each attribute, collates an input image and a registered image included in the group of the attribute according to an identification characteristic corresponding to the attribute, identifies an object in the input image, and executes output based on an identification result.

A monitoring system disclosed in Patent Literature 2 authenticates whether or not a passing person is a person who is a broadcast target from features of the passing person who is imaged, and, when the passing person is authenticated as a person who is a broadcast target, if a warning unnecessary condition is satisfied, the monitoring system performs control such that broadcasting using a warning is not performed.

A room entry management system disclosed in Patent Literature 3 opens, in a case where a specific operation is authenticated, a management target door and permits a person who is permitted to enter a room to enter the room together with a person who is not permitted to enter the room. On the other hand, in a case where the specific operation is not authenticated, the room entry management system does not open the management target door and does not permit a person who is permitted to enter the room to enter the room together with a person who is not permitted to enter the room.

CITATION LIST

Patent Literature

Patent Literature 1: Japanese Unexamined Patent Application Publication No. 2018-005574

Patent Literature 2: Japanese Unexamined Patent Application Publication No. 2020-160573

Patent Literature 3: Japanese Unexamined Patent Application Publication No. 2020-088462

SUMMARY OF INVENTION

Technical Problem

The above-described techniques have been proposed for exception processing and the like in a case where authentication is performed. However, the techniques are not techniques that focus on a member configuration or the like in a predetermined group such as a family companion.

In view of the above-described problems, an object of the present disclosure is to provide an authentication system or the like that efficiently authenticates a predetermined group.

Solution to Problem

An authentication system according to an aspect of the present disclosure includes an authentication means and a condition setting means. The authentication means performs biometric authentication of a person on the basis of a predetermined personal authentication criterion. The condition setting means sets a group authentication condition for another member in a group to which the person belongs on the basis of attribute information of the authenticated person. The authentication means authenticates another member on the basis of the set group authentication condition.

In an authentication method according to an aspect of the present disclosure, a computer executes the following processes. The computer performs biometric authentication of a person on the basis of a predetermined personal authentication criterion. The computer sets a group authentication condition for another member in a group to which the person belongs on the basis of attribute information of the authenticated person. In addition, the computer authenticates another member on the basis of the set group authentication condition.

A non-transitory computer readable medium according to an aspect of the present disclosure causes a computer to execute the following method. The computer performs biometric authentication of a person on the basis of a predetermined personal authentication criterion. The computer sets a group authentication condition for another member in a group to which the person belongs on the basis of attribute information of the authenticated person. In addition, the computer authenticates another member on the basis of the set group authentication condition.

Advantageous Effects of Invention

According to the present disclosure, it is possible to provide an authentication system or the like that efficiently authenticates a predetermined group.

BRIEF DESCRIPTION OF DRAWINGS

FIG. 6 is a table illustrating person information according to the second example embodiment.

FIG. 7 is a table illustrating a group authentication condition according to the second example embodiment.

EXAMPLE EMBODIMENT

Figure 1:
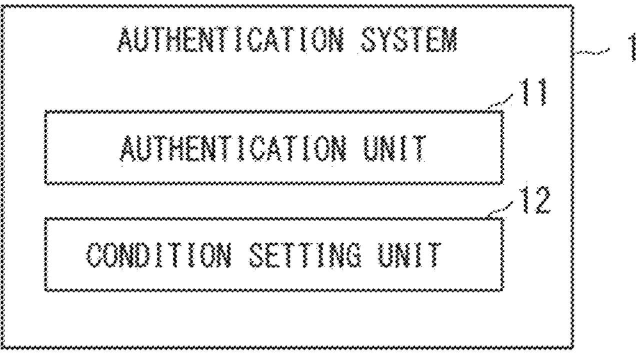
FIG. 1 is a block diagram of an authentication system according to a first example embodiment.

Hereinafter, the present disclosure will be described through example embodiments, but the disclosure according to the claims is not limited to the following example embodiments. Not all the configurations described in the example embodiments are essential as means for solving the problem. In the drawings, the same elements are denoted by the same reference numerals, and repeated description is omitted as necessary.

First Example Embodiment

A first example embodiment of the present disclosure will be described. FIG. 1 is a block diagram of an authentication system according to a first example embodiment. An authentication system 1 illustrated in FIG. 1 is a system for performing authentication at a predetermined passage gate or the like. The predetermined passage gate is installed in, for example, customs at an airport, a gate of a theme park, or an event hall such as a concert or a conference hall.

The authentication system 1 can be configured by, for example, a computer or a server having a communication function. In the following description, a "computer" may include any one of a server apparatus, a blade server, and a cloud computing system. The authentication system 1 acquires image data of an image captured by a camera installed in a predetermined passage gate, and authenticates a person who is about to pass through the passage gate from the acquired image data. The authentication system 1 includes an authentication unit 11 and a condition setting unit 12 as main constituents.

The authentication unit 11 performs biometric authentication of the person from the image of the person included in the acquired image data. The image data may be a still image or a moving image captured every predetermined period (for example, 1/30 seconds). The image of the person may be an image from which biometric authentication can be performed. In a case where the authentication unit 11 performs the biometric authentication by using a face image, an image of a person includes at least a face of the person. In a case where the authentication unit 11 performs the biometric authentication by using a fingerprint image, an image of a person includes at least a finger of the person. The above-described face image or fingerprint may be used for the biometric authentication. In addition, an iris or a gait may be used for the biometric authentication. In addition, the biometric authentication may be performed by using a combination thereof. In addition to an image, for example, voice utterances of a person may be used for the biometric authentication.

In a case where the biometric authentication is performed, the authentication unit 11 extracts, for example, a feature point from an image related to the biometric authentication, and calculates a feature amount from the extracted feature point. Further, the authentication unit 11 determines whether or not the calculated feature amount is unique to a predetermined person. In this case, for example, the authentication unit 11 collates the calculated feature amount with a feature amount unique to a person retrievable by the authentication system 1.

In a case where the calculated feature amount and the retrieved feature amount match or are similar with a suitable degree of accuracy, the authentication unit 11 determines to authenticate the person related to the extracted feature amount. The degree of similarity with a corresponding degree of accuracy indicates, for example, that the degree of similarity of the feature amounts to be collated is more than a predetermined value (or a predetermined ratio). In this case, the degree of similarity may be quantitatively calculated or qualitatively calculated.

In this case, the authentication unit 11 performs the biometric authentication according to a predetermined personal authentication criterion. The predetermined personal authentication criterion is a criterion in a case where biometric authentication of a person as an individual is performed. The personal authentication criterion includes, for example, a threshold of the degree of similarity between a feature amount calculated by the authentication unit 11 and a retrieved feature amount unique to a person.

The condition setting unit 12 acquires, from attribute information of an authenticated person, information regarding a group to which the person belongs. The attribute information of the authenticated person may include the name, address, age, sex, nationality, and the like of the person. Furthermore, the attribute information may include information regarding a group to which the person belongs. The information regarding the group to which the person belongs includes, for example, information indicating whether the group is a family, a group of group travel, or a predetermined group such as a school or a company.

When the information regarding the group is acquired, the condition setting unit 12 sets a group authentication condition for another member in the group to which the person belongs. The group authentication condition is an authentication condition in a case where the authentication unit 11 performs biometric authentication of another member. The group authentication condition may include, for example, a threshold of the degree of similarity when feature amounts are collated.

The group authentication condition set by the condition setting unit 12 may not be constant. That is, the condition setting unit 12 may set a group authentication condition for each member of a group related to a person authenticated according to a personal authentication criterion.

In a case where the condition setting unit 12 sets a group authentication condition, the authentication unit 11 authenticates another member by using the set group authentication condition. That is, in this case, the authentication system 1 assumes that a member of the group to which the person belongs receives the biometric authentication after the person authenticated by the authentication unit 11 according to the personal authentication criterion, sets the group authentication condition, and performs the biometric authentication of the member of the group. By authenticating the group as described above, the authentication system 1 can smoothly perform authentication. Note that the authentication system 1 may have means for notifying an authentication target person or an administrator or the like of the authentication system 1 of a result of the authentication.

Note that a feature amount retrieved by the authentication unit 11 is not limited to the feature amount unique to the person as described above. The feature amount retrieved by the authentication unit 11 may be a feature amount for estimating the age or the gender. In this case, in a case of authenticating a person or a member of a group, the authentication unit 11 may set a condition that the age or the gender matches a predetermined criterion.

Figure 2:
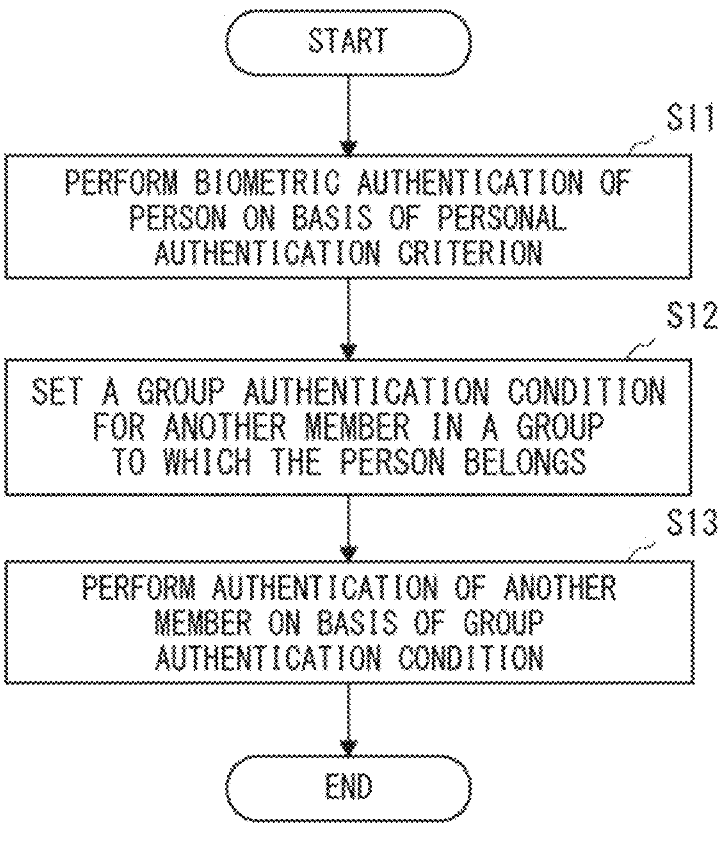
FIG. 2 is a flowchart illustrating an authentication method according to the first example embodiment.

Next, processing executed by the authentication system 1 will be described with reference to FIG. 2. FIG. 2 is a flowchart illustrating an authentication method according to the first example embodiment. The flowchart of FIG. 2 is started, for example, when the authentication system 1 acquires image data.

First, the authentication unit 11 performs biometric authentication of a person on the basis of a predetermined personal authentication criterion (step S11). When this person has been authenticated, the authentication unit 11 supplies a signal indicating that the authentication has been performed to the condition setting unit 12.

Next, the condition setting unit 12 sets a group authentication condition for another member in a group to which the person belongs on the basis of attribute information of the authenticated person (step S12). When the group authentication condition has been set, the condition setting unit 12 supplies a signal indicating that the group authentication condition has been set and information regarding the group authentication condition to the authentication unit 11.

Next, upon receiving the group authentication condition from the condition setting unit 12, the authentication unit 11 authenticates another member on the basis of the set group authentication condition (step S13). When the authentication unit 11 completes the authentication of the other member, the authentication system 1 ends a series of processes.

The authentication method executed by the authentication system 1 has been described above. In the above-described processing, the authentication system 1 also executes a process for notifying the authentication target person or the administrator or the like of the authentication system 1 of a result of the authentication. By executing the above-described processing, the authentication system 1 can smoothly execute the authentication of the group.

The authentication system according to the first example embodiment has been described above. Note that the authentication system 1 may include a processor and a storage device as constituents (not illustrated). The storage device included in the authentication system 1 includes, for example, a storage device including a nonvolatile memory such as a flash memory or a solid state drive (SSD). In this case, the storage device included in the authentication system 1 stores a computer program (hereinafter, also simply referred to as a program) for executing the above-described authentication method. In addition, the processor reads the computer program from the storage device into a buffer memory such as a dynamic random access memory (DRAM), and executes the program.

Each constituent of the authentication system 1 may be realized by dedicated hardware. Some or all of the constituent elements may be implemented by general-purpose or dedicated circuitry, a processor, or the like, or a combination thereof. These constituent elements may be configured with a single chip or may be configured with a plurality of chips connected via a bus. Some or all of constituent elements of each apparatus may be implemented by a combination of the above-described circuit or the like and a program. Furthermore, as the processor, a central processing unit (CPU), a graphics processing unit (GPU), a field-programmable gate array (FPGA), or the like may be used. Note that the description regarding the configuration described here can also be applied to other apparatuses or systems described below in the present disclosure.

In addition, in a case where some or all of the constituent elements of the authentication system 1 are implemented by a plurality of authentication systems, circuits, and the like, the plurality of authentication systems, circuits, and the like may be disposed in a centralized manner or in a distributed manner. For example, the authentication systems, the circuits, or the like may be implemented in the form of a client server system, a cloud computing system, or the like in which they are connected to each other via a communication network. In addition, the function of the authentication system may be provided in software as a service (SaaS) format. In addition, the above-described method may be stored in a computer readable medium to cause a computer to execute the method.

According to the present example embodiment, it is possible to provide an authentication system or the like that efficiently authenticates a predetermined group.

Second Example Embodiment

Figure 3:
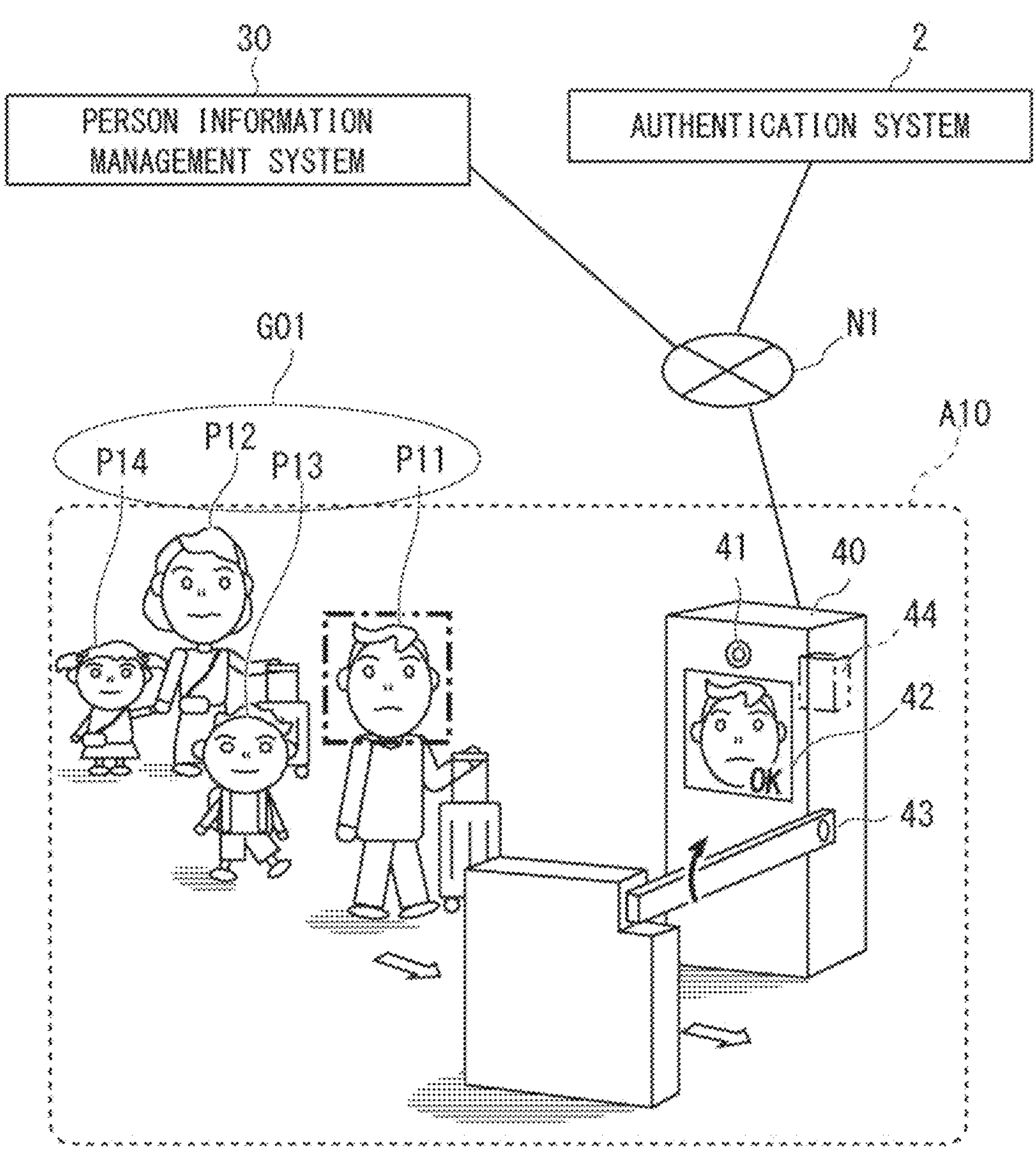
FIG. 3 is a diagram illustrating an authentication system and a usage mode of a related configuration according to a second example embodiment.

A second example embodiment of the present disclosure will be described. FIG. 3 is a diagram illustrating an authentication system and a usage mode of a related configuration according to a second example embodiment. FIG. 3 illustrates an authentication system 2, a person information management system 30, and an access control terminal 40. The authentication system 2, the person information management system 30, and the access control terminal 40 are communicatively connected to a network N1.

FIG. 3 illustrates a situation in which a group G01 as a family is about to pass through the access control terminal 40 installed in an airport A10. The group G01 includes persons P11, P12, P13, and P14 as members. FIG. 3 illustrates a situation in which the person P11 is being authenticated. After the situation illustrated in FIG. 3, following the person P11, the persons P12, P13, and P14 are also authenticated.

In this case, in a case where it can be ascertained in advance that the group G01 is going to pass through a gate section 43 as a family companion, the authentication system 2 can incorporate the fact into authentication conditions. More specifically, the authentication system 2 can efficiently perform authentication of the family of the person P11 by setting the group authentication condition after performing authentication of the person P11 according to the personal authentication criterion. For example, the person P13 and the person P14 are infants. In general, in the case of authenticating an infant through biometric authentication, it may take more time than in the case of authenticating an adult, or the accuracy may decrease. Therefore, the authentication system 2 can individually set authentication conditions for the persons P13 and P14 included in the family member of the person P11.

In the configuration illustrated in FIG. 3, the authentication system 2 is communicatively connected to the access control terminal 40. The authentication system 2 receives image data acquired by the access control terminal 40 and performs biometric authentication of a person included in the received image data. In addition, the authentication system 2 supplies a signal indicating a result of the biometric authentication to the access control terminal 40. The authentication system 2 is communicatively connected to the person information management system 30, and receives attribute information regarding the authenticated person from the person information management system 30.

The person information management system 30 is a system for managing airline tickets at the airport A10, and stores predetermined information regarding the group G01. The person information management system 30 is communicatively connected to the authentication system 2, and appropriately provides the authentication system 2 with attribute information regarding the authenticated person.

The access control terminal 40 is a terminal apparatus for performing authentication when a person passes through customs or the like. The access control terminal 40 includes a camera 41, a display section 42, a gate section 43, and an access control unit 44 as main constituents.

The camera 41 captures an image of a person to perform biometric authentication of the person passing through the gate section 43. The display section 42 displays information such as a result of the authentication of the person passing through the gate section 43. The gate section 43 is a door-shaped or bar-shaped member that is set to be openable and closable in a passage through which a person passes, and is driven in response to an instruction from the access control unit 44.

The access control unit 44 includes a calculation apparatus that controls each constituent of the access control terminal 40 and a communication apparatus for communicating with the authentication system 2 via the network N1. The access control unit 44 causes the camera 41 to capture an image of a person who is about to pass through the gate section 43, and supplies the image captured by the camera 41 to the authentication system 2. In addition, in a case where a signal indicating that the person has been authenticated is received from the authentication system 2, the access control unit 44 drives the gate section 43 such that the person can pass through the gate section.

Figure 4:
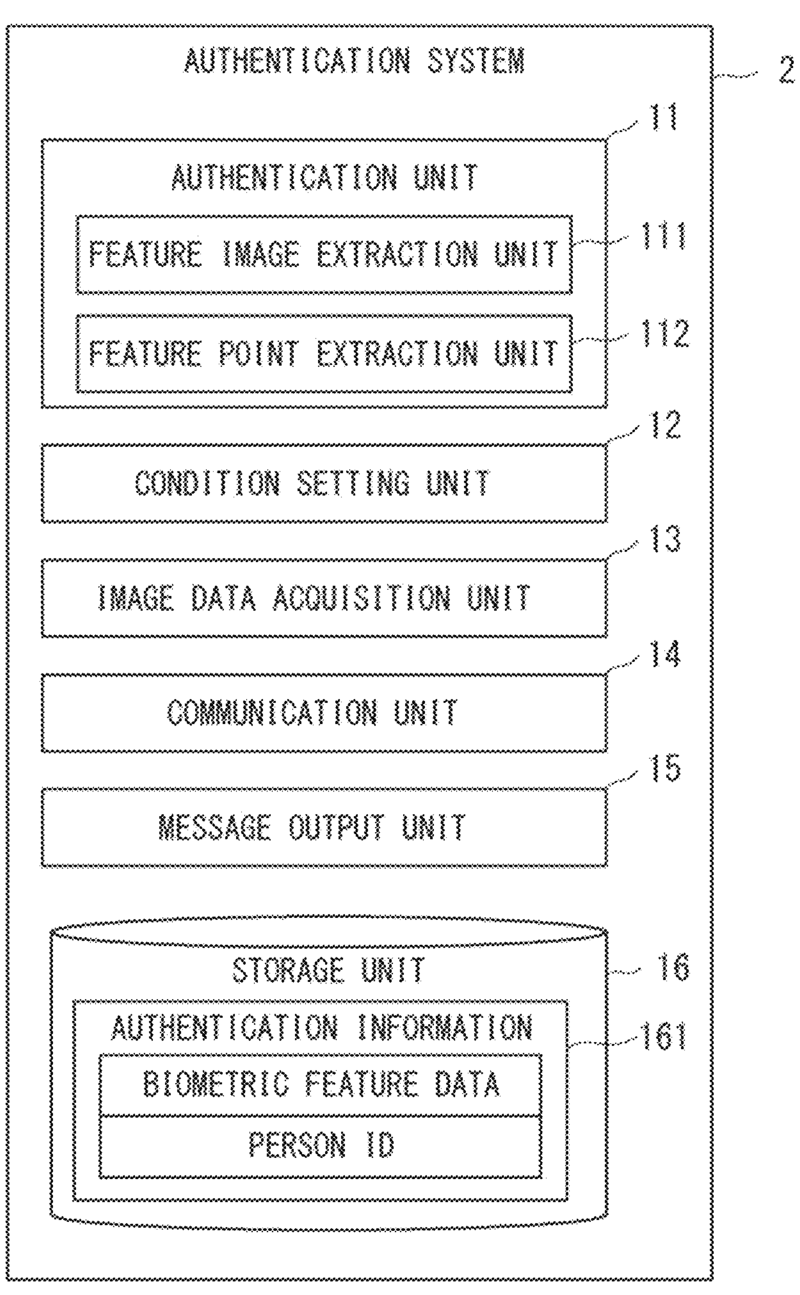
FIG. 4 is a block diagram of an authentication system according to the second example embodiment.

A configuration of the authentication system 2 will be described with reference to FIG. 4. FIG. 4 is a block diagram of an authentication system according to a second example embodiment. The authentication system 2 includes an authentication unit 11, a condition setting unit 12, an image data acquisition unit 13, a communication unit 14, a message output unit 15, and a storage unit 16 as main constituents.

The authentication unit 11 is as described in the first example embodiment, but will be described in more detail here. The authentication unit 11 includes a feature image extraction unit 111 and a feature point extraction unit 112 as functional constituents for authentication.

The feature image extraction unit 111 receives image data received from the access control terminal 40, and extracts a feature image related to biometric authentication of a person from an image of the received image data. In the present example embodiment, the authentication system 2 authenticates a person by using a face image. Therefore, the feature image extraction unit 111 extracts a face image of a person included in the image as a feature image.

The feature point extraction unit 112 extracts feature points from a facial image that is a feature image extracted by the feature image extraction unit 111. More specifically, the feature point extraction unit 112 extracts a position of a point to be a feature of the face according to a predetermined algorithm. Note that the above-described extraction of feature points and biometric authentication performed by the authentication unit 11 thereafter are techniques already known to those skilled in the art. Therefore, detailed descriptions thereof will be omitted here.

With the above-described techniques, the authentication unit 11 can also estimate whether or not the age of a person is less than a predetermined threshold age, for example. With such a function, for example, the authentication system 2 can be said to perform authentication of an infant who is relatively difficult to perform authentication among the members of the group by estimating the age thereof and collating the estimated age with attribute information of the infant who is a member of the group.

Note that the authentication unit 11 may perform biometric authentication from an image of a member or voice of the member. For example, the authentication system 2 may perform authentication with voice in a case of authenticating a member of a group related to a person authenticated according to the personal authentication criterion. In addition, the authentication unit 11 may extract any one of a face image, an iris image, and a fingerprint image from the image of the member as biometric information, and perform biometric authentication on the basis of the extracted biometric information.

The condition setting unit 12 makes an inquiry about the attribute information of the person authenticated by the authentication unit 11 to the person information management system 30. More specifically, the condition setting unit 12 supplies a person identifier (ID) of the person authenticated by the authentication unit 11 to the person information management system 30. The person information management system 30 supplies attribute information corresponding to the person ID received from the condition setting unit 12 to the condition setting unit 12. As a result, the condition setting unit 12 acquires the attribute information of the person authenticated according to the personal authentication criterion.

The condition setting unit 12 sets a group authentication condition that is an authentication condition for another member of the group according to the attribute information. As described above, since the authentication condition for another member can be set, for example, the authentication system 2 can lower a predetermined threshold related to the authentication of another member. With such a configuration, the authentication system 2 can easily authenticate other members of the group to which the person authenticated according to the personal authentication criterion belongs, and can process the authentication of the entire group in a shorter time.

The condition setting unit 12 can specify that the person authenticated by the authentication unit 11 according to the personal authentication criterion is the representative of the group. More specifically, the condition setting unit 12 reads the fact that the person authenticated by the authentication unit 11 is a representative of the group from the information included in the attribute information received from the person information management system 30. Similarly, the condition setting unit 12 may specify that the person authenticated by the authentication unit 11 is not a representative of the group. The condition setting unit 12 may determine whether or not to set the group authentication condition depending on whether or not the authenticated person is a representative of the group.

That is, in this case, in a case where the authenticated person is a representative, the authentication unit 11 authenticates another member according to the group authentication condition. On the other hand, in a case where the authenticated person is not a representative, the authentication unit 11 authenticates another member on the basis of the personal authentication criterion instead of the group authentication condition. With such a configuration, the authentication system 2 can easily process the authentication of the entire group by using the precondition that the representative is authenticated.

The condition setting unit 12 may set the group authentication condition according to the age of the member of the group included in the attribute information. With such a configuration, the authentication system 2 can lower an authentication level of the infant according to the group authentication condition set after the representative of the group receives the authentication. As a result, the authentication system 2 can efficiently perform authentication of the entire group.

The image data acquisition unit 13 acquires image data from the access control terminal 40. The image data acquisition unit 13 supplies the received image data to the authentication unit 11. The image data acquisition unit 13 may supply the image data to the authentication unit 11 after performing predetermined processing such as trimming or tone adjustment on the received image data.

The communication unit 14 is an interface for the authentication system 2 to communicate with the person information management system 30 or the access control terminal 40 via the network N1. For example, the communication unit 14 supplies the person ID of the authenticated person to the person information management system 30, and receives the attribute information of the person from the person information management system 30 in response to the supply. The communication unit 14 also receives image data from the access control terminal 40, for example. Furthermore, the communication unit 14 supplies a predetermined message output by the message output unit 15 to the access control terminal 40.

The message output unit 15 generates a predetermined message related to authentication, and outputs the generated message to the access control terminal 40. The predetermined message may include, for example, content indicating that the authentication has been successful. In addition, the predetermined message may include content indicating that authentication has failed. The predetermined message may include various other pieces of content.

For example, in a case where the authenticated person is not a representative of the group, the message output unit 15 may output a message for prompting authentication of a representative. By outputting such a message, the authentication system 2 can suitably appeal an efficient authentication procedure to a user of the authentication system.

In a case where the age of the person estimated by the authentication unit 11 is less than the threshold age and the authentication means performs the biometric authentication on the basis of the personal authentication criterion, the message output unit 15 can output a message for prompting authentication of a representative. With such a configuration, the authentication system 2 can prompt an authentication target person to undergo authentication of an adult before an infant is authenticated, for example.

The storage unit 16 is a storage device including a nonvolatile memory such as a flash memory, an SSD, or a hard disk drive (HDD). The storage unit 16 includes at least authentication information 161. The authentication information 161 is information for authenticating a person, and is stored in a state in which biometric feature data and a person ID are associated with each other. The biometric feature data includes data regarding feature points of a face image. The person ID is unique identification information of a person related to authentication. The storage unit 16 supplies the biometric feature data to the authentication unit 11. In addition, the storage unit 16 supplies the person ID of the person who has been successfully authenticated to the communication unit 14. The communication unit 14 supplies the person ID received from the storage unit 16 to the person information management system 30.

Figure 5:
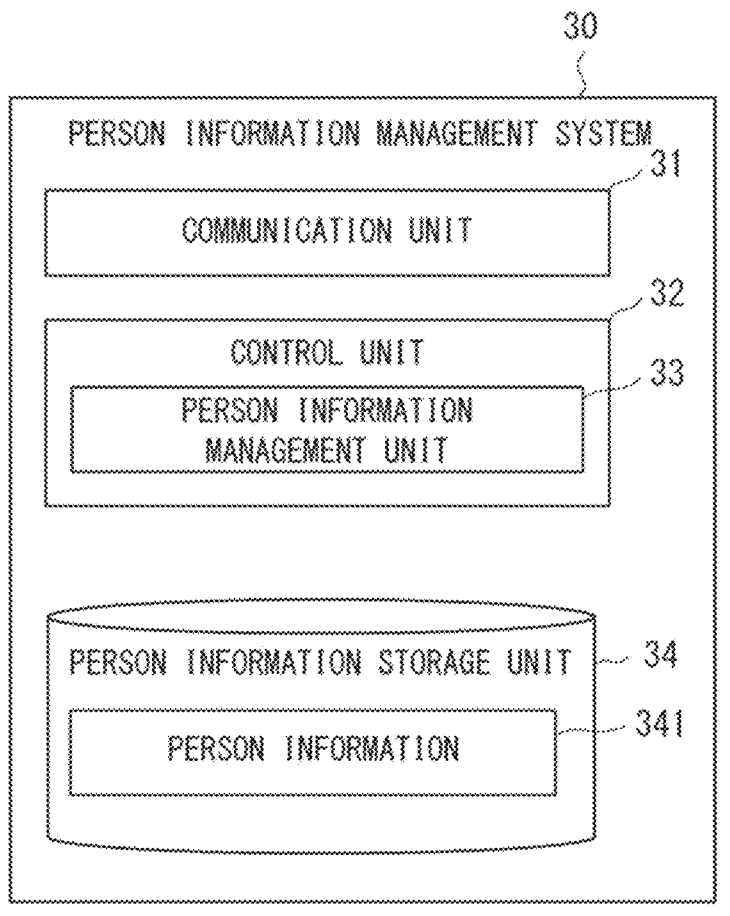
FIG. 5 is a block diagram of a person information management system according to the second example embodiment.

FIG. 5 is a block diagram of the person information management system 30 according to the second example embodiment. The person information management system 30 according to the present example embodiment manages a person ID, information regarding an airline ticket reserved by the person, and attribute information of the person in association with each other. The person information management system 30 is, for example, a computer installed in any place. The person information management system 30 includes a communication unit 31, a control unit 32, and a person information storage unit 34 as main constituents.

The communication unit 31 is an interface for the person information management system 30 to connect to the network N1. For example, the communication unit 31 receives a person ID related to authentication as an inquiry from the authentication system 2. In addition, the communication unit 31 may supply attribute information of the person associated with the received person ID to the authentication system 2 as a response to the inquiry.

The control unit 32 is a calculation apparatus (calculation circuit) for controlling the person information management system 30, and includes a person information management unit 33. The person information management unit 33 generates and updates person information 341 stored in the person information storage unit 34.

The person information storage unit 34 is a storage device including a nonvolatile memory, and stores at least the person information 341.

The person information 341 will be described with reference to FIG. 6. FIG. 6 is a table illustrating the person information according to the second example embodiment. The table of FIG. 6 illustrates a part of the person information 341. The person information 341 illustrated in FIG. 6 is information regarding the group G01 illustrated in FIG. 3. The person information 341 stores a "person ID", a "group ID", a "group representative flag", a "group attribute", an "age", and a "gender" in association with each other. For example, the person ID 0011 corresponds to the person P11 in FIG. 3. The attribute information of the person P11 indicates that the group ID is G01, the group representative flag is 1, the group attribute is family, the age is 36, and the gender is male.

Similarly, the person ID corresponding to the person P12 in FIG. 3 is 0012, and the attribute information in the person information 341 indicates that the group ID is G01, the group representative flag is 1, the group attribute is family, the age is 34, and the gender is female. Further, the person ID corresponding to the person P13 is 0013, and the attribute information in the person information 341 indicates that the group ID is G01, the group representative flag is 0, the group attribute is family, the age is 5, and the gender is male. The person ID corresponding to the person P14 in FIG. 3 is 0014, and the attribute information in the person information 341 indicates that the group ID is G01, the group representative flag is 0, the group attribute is family, the age is 3, and the gender is female.

As described above, the person information 341 includes information regarding a group of a person as the attribute information. By receiving the attribute information from the person information management system 30, the authentication system 2 can acquire information such as the fact that the person P11 who has been successfully authenticated is a representative of the group G01 or the age of another member of the group G01.

Next, an example of a group authentication condition will be described with reference to FIG. 7. FIG. 7 is a table illustrating a group authentication condition according to the second example embodiment. FIG. 7 illustrates a "representative member authentication score X1" and an "authentication threshold X2 for another member" corresponding thereto. The representative member authentication score is an authentication score of a representative of the group that has been authenticated.

The authentication score is an index indicating the degree of similarity between a feature amount extracted by the authentication unit 11 from an image of a person captured by the access control terminal 40 and biometric feature data included in the authentication information 161. The authentication score in this example has a minimum value of 0 (zero) and a maximum value of 1.0. That is, the higher the value of the authentication score, the higher the certainty of authentication.

The authentication threshold for another member is the degree of similarity to biometric feature data indicating a condition under which authentication is successful in a case where authentication of another member is performed. The authentication threshold in this example is a value in which a minimum value is 0 (zero) and a maximum value is 1.0 similarly to the authentication score. In addition, the authentication threshold indicates that the higher the value, the higher the degree of similarity to the biometric feature data, and the higher the accuracy of authentication.

In the group authentication condition according to the table of FIG. 7, in a case where the "representative member authentication score X1" is 0.7 or more and 1.0 or less, the "authentication threshold X2 for another member" corresponding thereto is set to 0.4 or more. In addition, in the group authentication condition, in a case where the "representative member authentication score X1" is 0.6 or more and less than 0.7, the "authentication threshold X2 for another member" corresponding thereto is set to 0.6 or more.

That is, in a case where the score when a representative is authenticated is relatively high, the authentication accuracy for another member is set to be relatively low. As described above, by setting the group authentication condition, the authentication system 2 lowers the accuracy of authentication of another member as the certainty of authentication of a representative becomes higher, and makes the authentication of the entire group smooth. On the other hand, in a case where the certainty of the authentication of the representative of the group is not relatively high, the authentication of another member is performed relatively carefully. As described above, the authentication system 2 can adjust the balance between the efficiency of authentication and the accuracy of authentication.

The group authentication condition set by the authentication system 2 is not limited to the above content. The authentication system 2 may employ various group authentication conditions. For example, the authentication system 2 may have one or three or more types of group authentication conditions instead of the two types of group authentication conditions as illustrated in FIG. 7.

The group authentication condition may be set according to an attribute of an authentication target person. For example, in a case where it can be read from the attribute information that a non-representative of the group is an infant, the authentication system 2 may set a threshold to be low. In addition, the group authentication condition may be different between authentication means performed by a representative of the group and authentication means performed by a non-representative. For example, in this case, the authentication system 2 may perform biometric authentication of the representative by using a face image, and perform biometric authentication of another member who is a non-representative by using an iris. With such a configuration, the authentication system 2 can suitably perform parent-child authentication in a case of, for example, authentication for the purpose of vaccination or vaccine proof of an infant.

In addition, for example, the authentication system 2 may use the "representative member authentication score X1" as a statistical value of all representatives. For example, in the case of the group G01, the persons P11 and P12 are representatives. In this case, the "representative member authentication score X1" may be an average value of an authentication score of the person P11 and an authentication score of the person P12. Furthermore, for example, the authentication system 2 may set the "representative member authentication score X1" to the maximum value or the minimum value of the authentication scores of all the representatives.

In addition, for example, when the success record of the authentication of the group increases, the condition setting unit 12 may lower a value of the "authentication threshold X2 for another member" accordingly. With such a setting, the authentication system 2 can improve the efficiency of authentication of the entire group.

Figure 8:
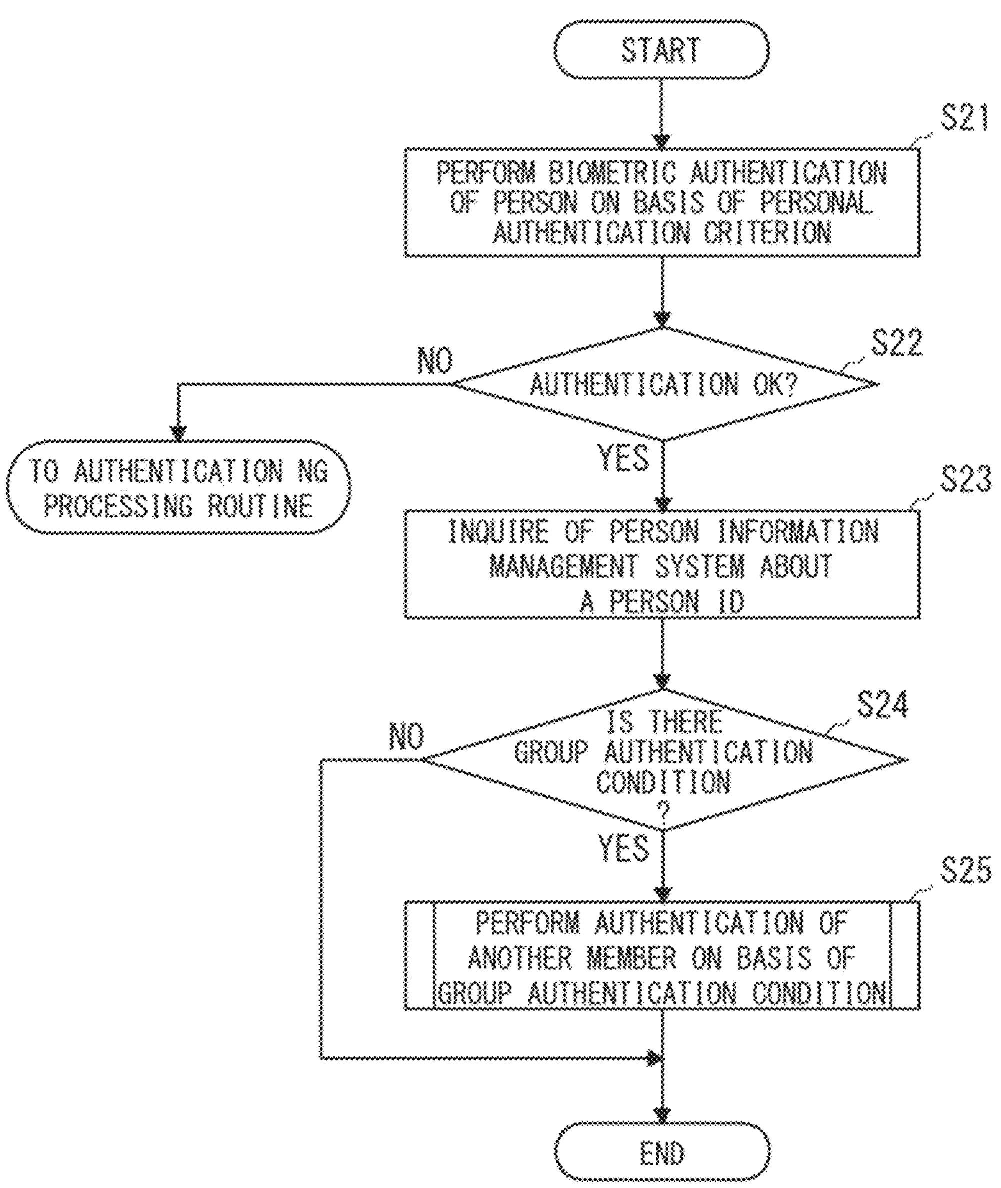
FIG. 8 is a first flowchart illustrating an authentication method according to the second example embodiment.

FIG. 8 is a first flowchart illustrating an authentication method according to the second example embodiment. The flowchart of FIG. 8 illustrates processing executed by the authentication system 2. The flowchart of FIG. 8 is started, for example, in a case where the authentication system 2 receives image data from the access control terminal 40.

First, the authentication unit 11 performs biometric authentication of a person on the basis of a predetermined personal authentication criterion (step S21). Next, the authentication unit 11 determines whether or not the authentication of this person is OK (success) (step S22). In a case where it is determined that the authentication is not OK (step S22: NO), the authentication system 2 proceeds to an authentication NG processing routine. Note that a well-known technique can be adopted for the processing in a case where the authentication is NG, and thus, a detailed description thereof will be omitted here. On the other hand, in a case where it is determined that the authentication is OK (step S22: YES), the authentication system 2 proceeds to step S23.

In step S23, the condition setting unit 12 inquires of the person information management system 30 about a person ID of the person whose authentication is OK (step S23). Through this inquiry, the authentication system 2 receives attribute information corresponding to the person ID from the person information management system 30.

Next, the condition setting unit 12 determines whether or not there is a group authentication condition from the attribute information of the authenticated person (step S24). The case where there is a group authentication condition is a case where a person related to authentication belongs to a group, and the attribute information includes information regarding the group. On the other hand, the case where there is no group authentication condition is a case where a person related to the authentication does not belong to the group. In other words, in a case where the attribute information regarding the person related to the authentication does not include the information regarding the group, the authentication system 2 does not set the group authentication condition.

In a case where it is determined that there is no group authentication condition related to the authenticated person (step S24: NO), the authentication system 2 ends the processing. In a case where it is determined that there is a group authentication condition related to the authenticated person (step S24: YES), the authentication system 2 proceeds to step S25.

In step S25, the authentication unit 11 authenticates another member according to the group authentication condition set by the condition setting unit 12 (step S25). When the authentication unit 11 completes the authentication of another member, the authentication system 2 ends a series of processes.

Figure 9:
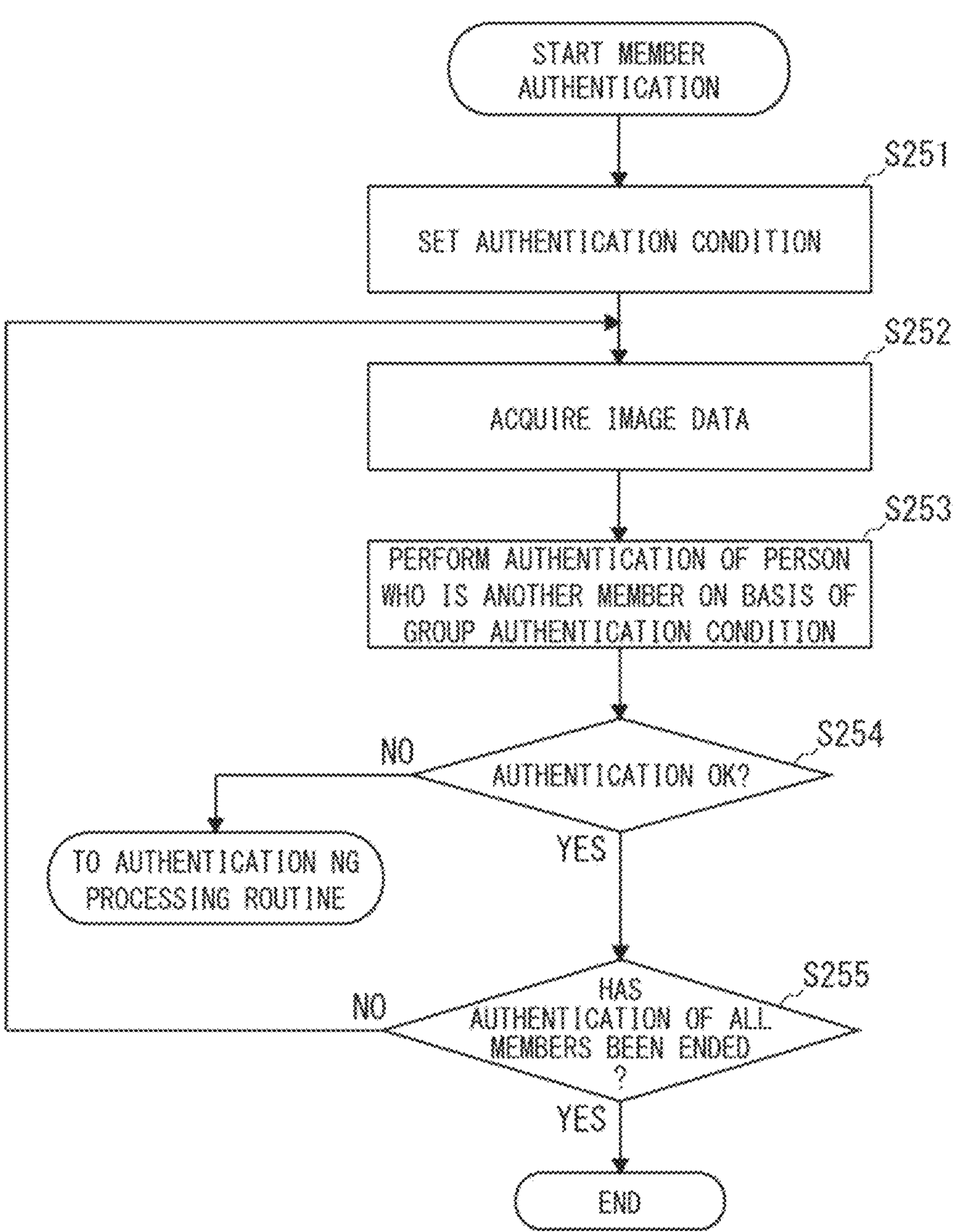
FIG. 9 is a second flowchart illustrating an authentication method according to the second example embodiment.

The above step S25 will be described with reference to FIG. 9. FIG. 9 is a second flowchart illustrating an authentication method according to the second example embodiment. The flowchart of FIG. 9 illustrates details of step S25 in FIG. 8.

First, the condition setting unit 12 sets an authentication condition for another member (step S251). Next, the image data acquisition unit 13 acquires image data of a captured image of another member (step S252).

Next, the authentication unit 11 performs biometric authentication of a person who is another member according to the set group authentication condition (step S253). Next, the authentication unit 11 determines whether the authentication of this person is OK (success) (step S254). In a case where it is determined that the authentication is not OK (step S254: NO), the authentication system 2 proceeds to an authentication NG processing routine. On the other hand, in a case where it is determined that the authentication is OK (step S254: YES), the authentication system 2 proceeds to step S255.

In step S255, the authentication system 2 determines whether or not the authentication of all the members of the group has been completed (step S255). In a case where it is determined that the authentication of all the members of the group has not been completed (step S255: NO), the authentication system 2 returns to step S252 and repeats the authentication of another member whose authentication has not been completed. In a case where it is determined that the authentication of all the members of the group has been completed (step S255: YES), the authentication system 2 ends a series of authentication processes.

The second example embodiment has been described above. In FIGS. 8 and 9, in a case where the authentication is OK or NG, the authentication system 2 may output a message regarding authentication OK or NG to the access control terminal 40. The authentication system 2 described above may include at least a part of the person information management system 30 and the access control terminal 40. With the above-described configuration, the authentication system 2 can shorten the processing time for authenticating the group. As a result, for example, the authentication system 2 can complete the authentication while the group passes through the gate section 43 while walking. In other words, the authentication system 2 can authenticate more persons for a predetermined period. Therefore, according to the present example embodiment, it is possible to provide an authentication system or the like that efficiently authenticates a predetermined group.

Third Example Embodiment

Figure 10:
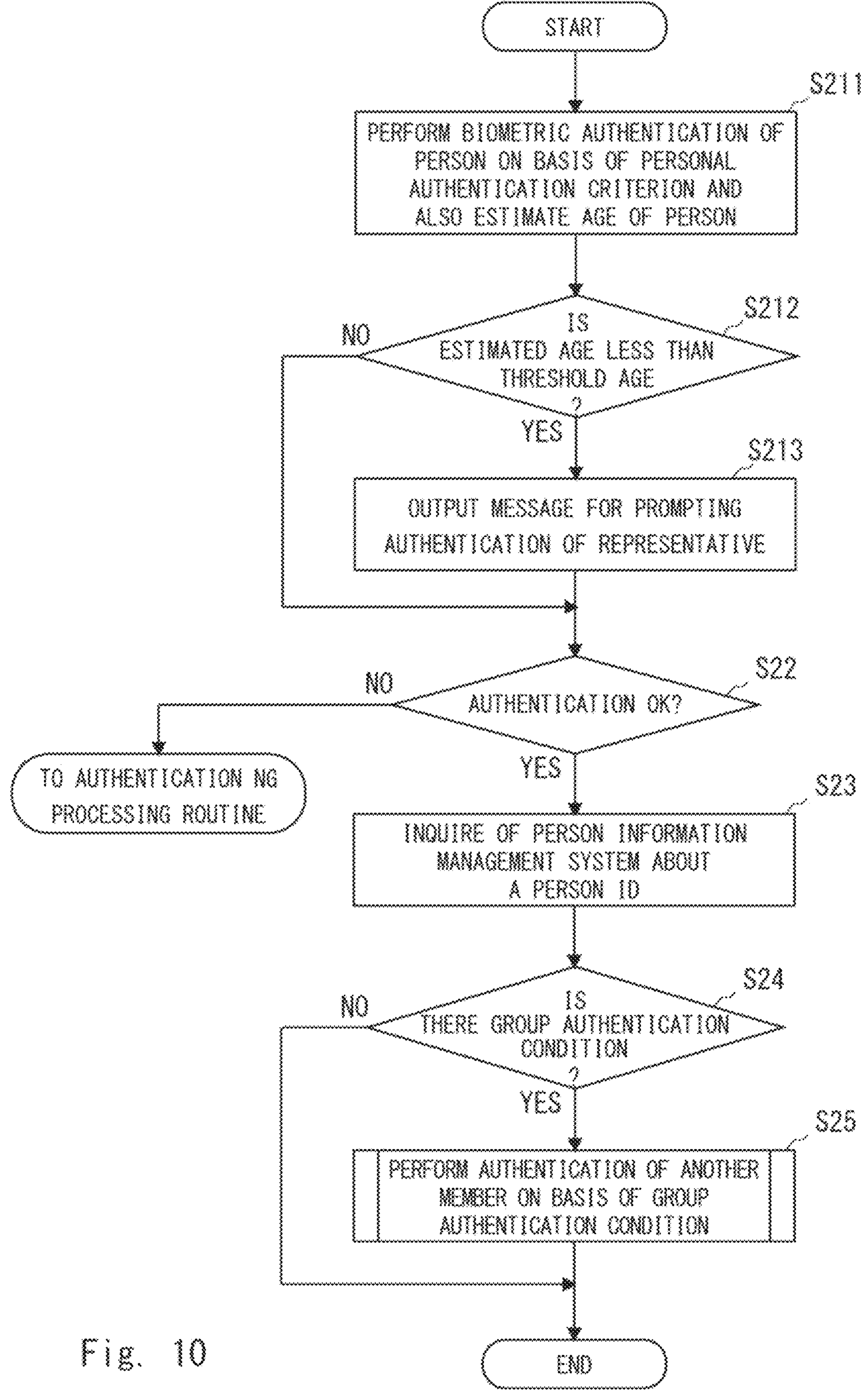
FIG. 10 is a flowchart illustrating an authentication method according to a third example embodiment.

Next, a third example embodiment will be described with reference to FIG. 10. FIG. 10 is a flowchart illustrating an authentication method according to the third example embodiment. An authentication method for the authentication system 2 according to the third example embodiment is different from that in the flowchart of FIG. 8. More specifically, the flowchart of FIG. 10 is different from the flowchart of FIG. 8 in that processes in steps S211 to S2131 are performed instead of step S21. In the authentication system 2 according to the third example embodiment, the authentication unit 11 includes a function for estimating the age of a person related to authentication.

In step S21, the authentication unit 11 performs biometric authentication of a person according to the personal authentication criterion, and estimates the age of the person related to the authentication (step S211).

Next, the authentication unit 11 determines whether or not the estimated age of the person is less than a predetermined threshold (step S212). The estimated age for the predetermined threshold is, for example, about 0 to 10 years old. That is, the authentication system 2 according to the present example embodiment specifies that the person related to the authentication is an infant or a child.

In a case where it is determined that the estimated age of the person is not less than the predetermined threshold (step S212: NO), the authentication system 2 proceeds to step S22, and thereafter, performs the same processing as the processing illustrated in FIG. 8. In a case where it is determined that the estimated age of the person is less than the predetermined threshold (step S212: YES), the authentication system 2 proceeds to step S213.

In step S213, the message output unit 15 of the authentication system 2 outputs a message for prompting authentication of a representative to the access control terminal 40 (step S213). When the message output unit 15 outputs the message, the authentication system 2 proceeds to step S22, and thereafter, performs the same processing as the processing illustrated in FIG. 8.

The third example embodiment has been described above. According to the present example embodiment, the authentication system 2 prompts the authentication of a representative, and can perform group authentication more efficiently. Therefore, according to the present example embodiment, it is possible to provide an authentication system or the like that efficiently authenticates a predetermined group.

Fourth Example Embodiment

Figure 11:
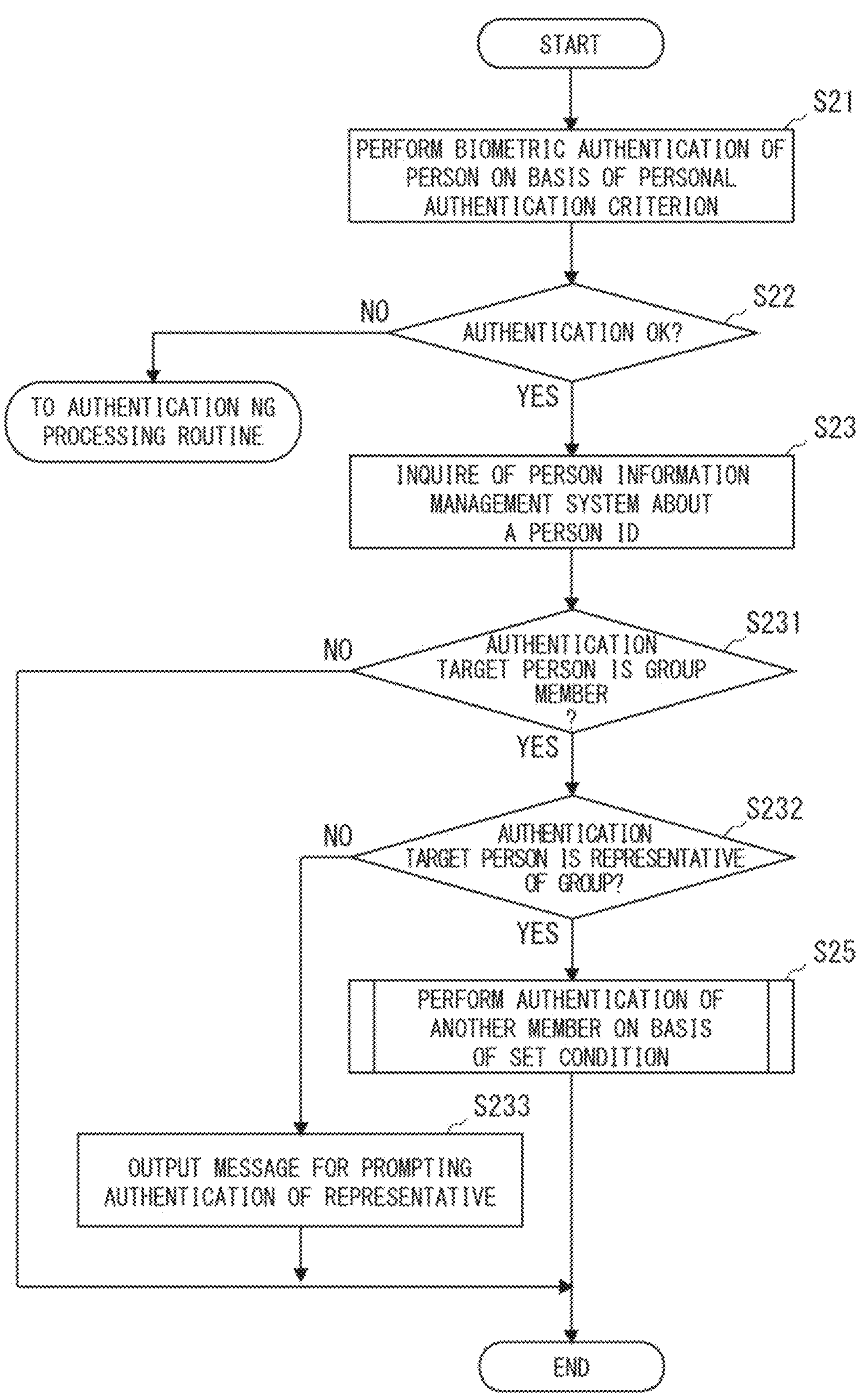
FIG. 11 is a flowchart illustrating an authentication method according to a fourth example embodiment.

Next, a fourth example embodiment will be described with reference to FIG. 11. FIG. 11 is a flowchart illustrating an authentication method according to the fourth example embodiment. The flowchart according to the fourth example embodiment is different from the flowchart of FIG. 8 in processes after step S23.

In step S23, the condition setting unit 12 inquires of the person information management system 30 about a person ID of the person whose authentication is OK (step S23). Through this inquiry, the authentication system 2 receives attribute information corresponding to the person ID from the person information management system 30.

After step S23, the authentication system 2 having received the attribute information corresponding to the person ID from the person information management system 30 reads the attribute information and determines whether or not the authenticated person, that is, the authentication target person is a member of the predetermined group (step S231).

In a case where it is determined that the authentication target person is not a member of the predetermined group (step S231: NO), the authentication system 2 ends a series of processes. On the other hand, in a case where it is determined that the authentication target person is a member of the predetermined group (step S231: YES), the authentication system 2 proceeds to step S232.

In step S232, the authentication system 2 determines whether the authentication target person is a representative of the group (step S232). In a case where it is determined that the authentication target person is a representative of the group (step S232: YES), the authentication system 2 proceeds to step S25 and authenticates another member through the same processing as in FIG. 8. On the other hand, in a case where it is determined that the authentication target person is not a representative of the group (step S232: NO), the authentication system 2 proceeds to step S233.

In step S233, the message output unit 15 outputs a message for prompting authentication of a representative (step S233). When the message output unit 15 outputs this message, the authentication system 2 ends a series of processes.

The fourth example embodiment has been described above. The authentication system 2 according to the present example embodiment continues the authentication based on the personal authentication criterion while prompting the authentication of the representative in a case where the authentication target person is not the representative of the group even in a case where the authentication of the member belonging to the group is performed. With such a configuration, the authentication system 2 can preferentially authenticate the representative. Therefore, according to the present example embodiment, it is possible to provide an authentication system or the like that efficiently authenticates a predetermined group.

Fifth Example Embodiment

Figure 12:
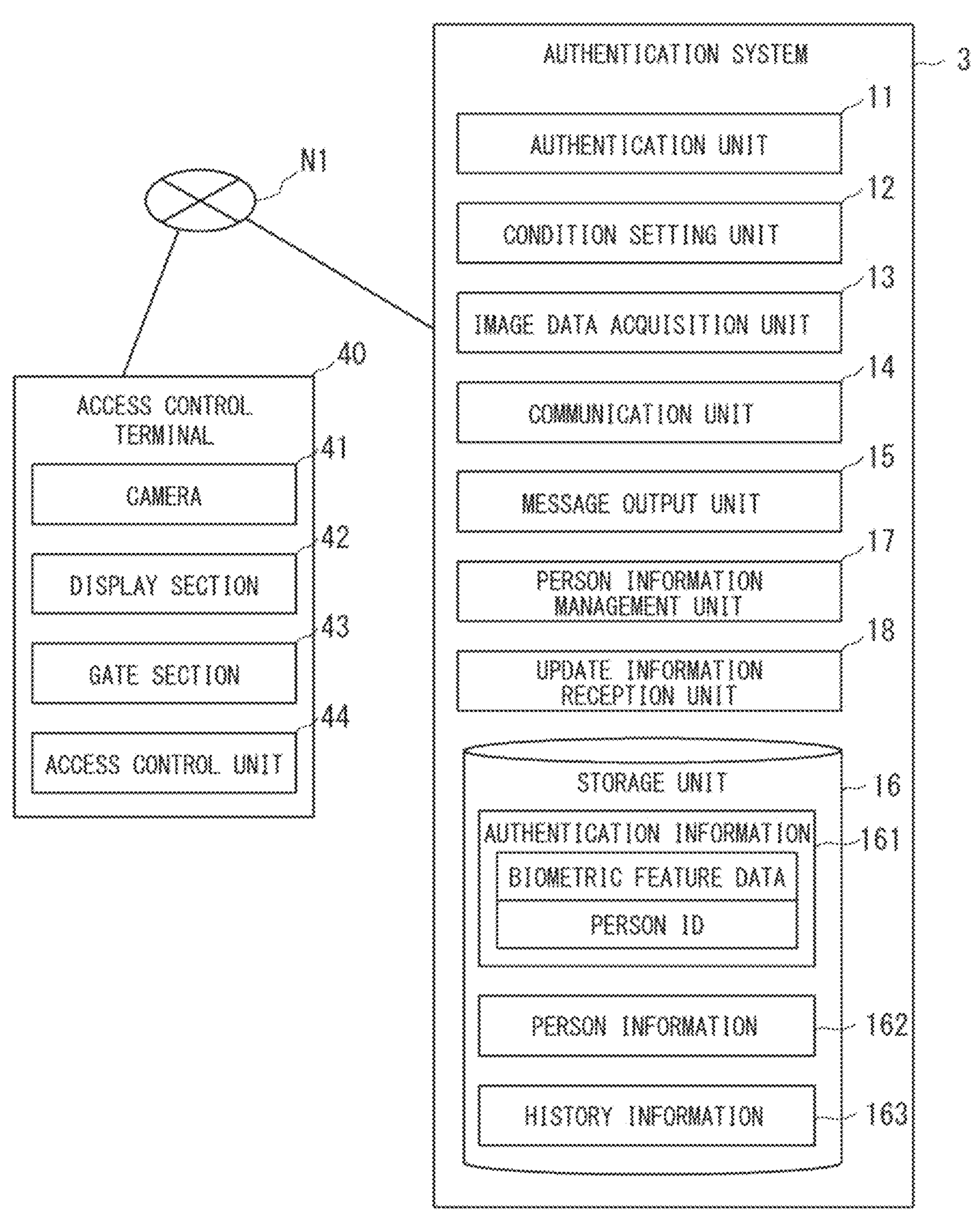
FIG. 12 is a block diagram of an authentication system according to a fifth example embodiment.

Next, a fifth example embodiment will be described. FIG. 12 is a block diagram of an authentication system according to the fifth example embodiment. An authentication system 3 illustrated in FIG. 12 is different from the authentication system 2 illustrated in FIG. 3 in that the authentication system 3 includes person information. The authentication system 3 further includes a person information management unit 17 and an update information reception unit 18. The authentication system 3 illustrated in FIG. 12 is communicatively connected to the access control terminal 40 via the network N1.

The storage unit 16 according to the present example embodiment includes person information 162. The person information 162 is information in which authentication information of a person is associated with attribute information regarding a group to which the person belongs. In addition, the condition setting unit 12 according to the present example embodiment reads attribute information stored in the storage unit 16, and sets a group authentication condition of a person related to authentication from the read attribute information.

The storage unit 16 according to the present example embodiment includes history information 163. The history information 163 includes information for updating the group authentication condition.

The person information management unit 17 included in the authentication system 3 generates or updates the person information 162 stored in the storage unit 16.

The update information reception unit 18 included in the authentication system 3 receives predetermined information for updating the group authentication condition. That is, the authentication system 3 may set the group authentication condition in consideration of the update information received by the update information reception unit 18 in addition to the attribute information included in the person information 162.

For example, in a case where a plurality of different groups are included in the attribute information of the person, the update information reception unit 18 receives a selection operation for authenticating the groups according to one group authentication condition. As a result, the authentication system 3 can efficiently authenticate a person belonging to a plurality of groups.

Note that means with which the update information reception unit 18 receives the update information may be any means. That is, for example, the update information reception unit 18 may include information settlement means for a person related to authentication to perform a predetermined operation. The information settlement means for a person related to the authentication to perform a predetermined operation may be, for example, an information input apparatus such as a keyboard or a touch panel, or may be an apparatus that detects voice, a gesture, or the like of the person related to the authentication.

The update information reception unit 18 may receive registration of a group to which a person belongs. As a result, the update information reception unit 18 can flexibly support authentication of the group. For example, in a case where a person requiring predetermined assistance passes through the gate section 43, a staff member of a facility that manages the access control terminal 40 may register a new group as a representative of the group. As a result, the authentication system 3 can flexibly and efficiently authenticate a person.

Further, the update information reception unit 18 may receive history information of a history of authentication of a person. In this case, the condition setting unit 12 may set the group authentication condition according to the history information received by the update information reception unit 18. As a result, the authentication system 3 can make an authentication condition for an authentication target person who is repeatedly authenticated correspond to the latest feature amount, for example. Therefore, the authentication system 3 can efficiently authenticate the person related to the history information.

In addition, the update information reception unit 18 may receive a first authentication level that is an authentication level in a predetermined outward path of the group, as the history information. In this case, the condition setting unit 12 sets a second authentication level of the group in a return path corresponding to the outward path to a level lower than the first authentication level. With such a configuration, the authentication system 3 can more efficiently perform authentication of the same group of members as in the outward path.

As described above, the update information reception unit 18 according to the present example embodiment receives the update information for updating the group authentication condition. The update information reception unit 18 stores the received update information in the storage unit 16 as the history information 163. In a case where another member in the group is authenticated, the condition setting unit 12 reads the update information and updates the group authentication condition according to the read update information. With such a configuration, the authentication system 3 can efficiently authenticate the group while coping with various situations.

Figure 13:
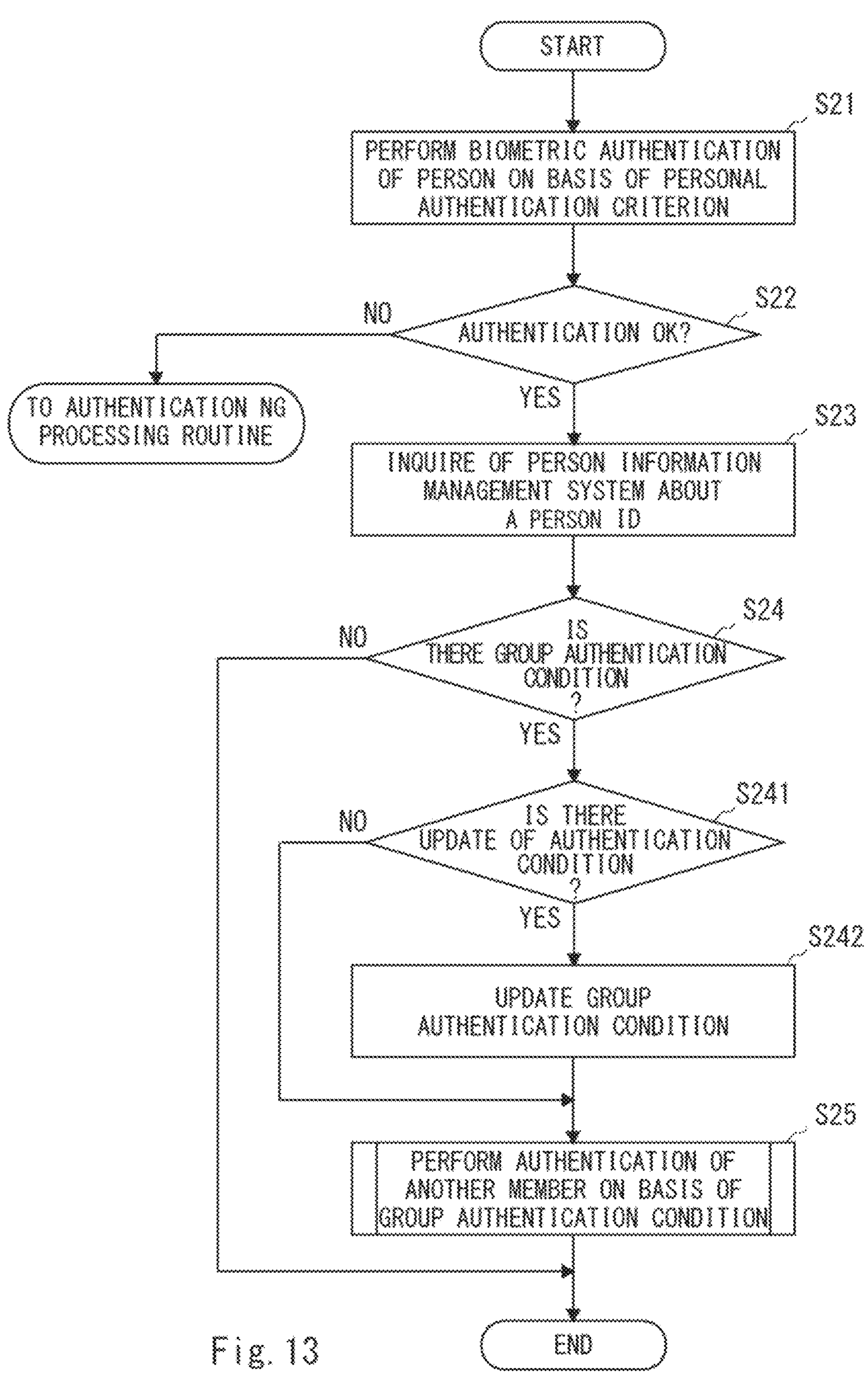
FIG. 13 is a flowchart illustrating an authentication method according to the fifth example embodiment.

Next, an example of an authentication method executed by the authentication system 3 will be described with reference to FIG. 13. FIG. 13 is a flowchart illustrating an authentication method according to the fifth example embodiment. The flowchart of FIG. 13 is different from the flowchart of FIG. 8 in that step S241 and step S242 are provided between step S24 and step S25.

In FIG. 13, the condition setting unit 12 determines whether there is a group authentication condition from the attribute information of the authenticated person (step S24). In a case where it is determined that there is no group authentication condition for the authenticated person (step S24: NO), the authentication system 3 ends the processing. In a case where it is determined that there is a group authentication condition for the authenticated person (step S24: YES), the authentication system 3 proceeds to step S241.

In step S241, the authentication system 3 reads the history information 163, and determines whether the authentication condition is updated with respect to the group authentication condition (step S241). In a case where it is determined that the group authentication condition is not updated (step S241: NO), the authentication system 3 proceeds to step S25 and authenticates another member similarly to the processing illustrated in FIG. 8. On the other hand, in a case where it is determined that the group authentication condition is updated (step S241: YES), the authentication system 3 updates the group authentication condition according to the history information 163 before authenticating another member (step S242). When the group authentication condition is updated, the authentication system 3 proceeds to step S25.

The fifth example embodiment has been described above. The authentication system 3 according to the present example embodiment is not limited to the above-described configuration. For example, the authentication system 3 may be configured to include at least a part of a plurality of the access control terminals 40. Alternatively, the authentication system 3 may be communicatively connected to a plurality of the access control terminals 40. According to the present example embodiment, it is possible to provide an authentication system or the like that efficiently authenticates a predetermined group.

<Example of Hardware Configuration>

Hereinafter, a case where each functional component of the determination apparatus in the present disclosure is implemented by a combination of hardware and software will be described.

Figure 14:
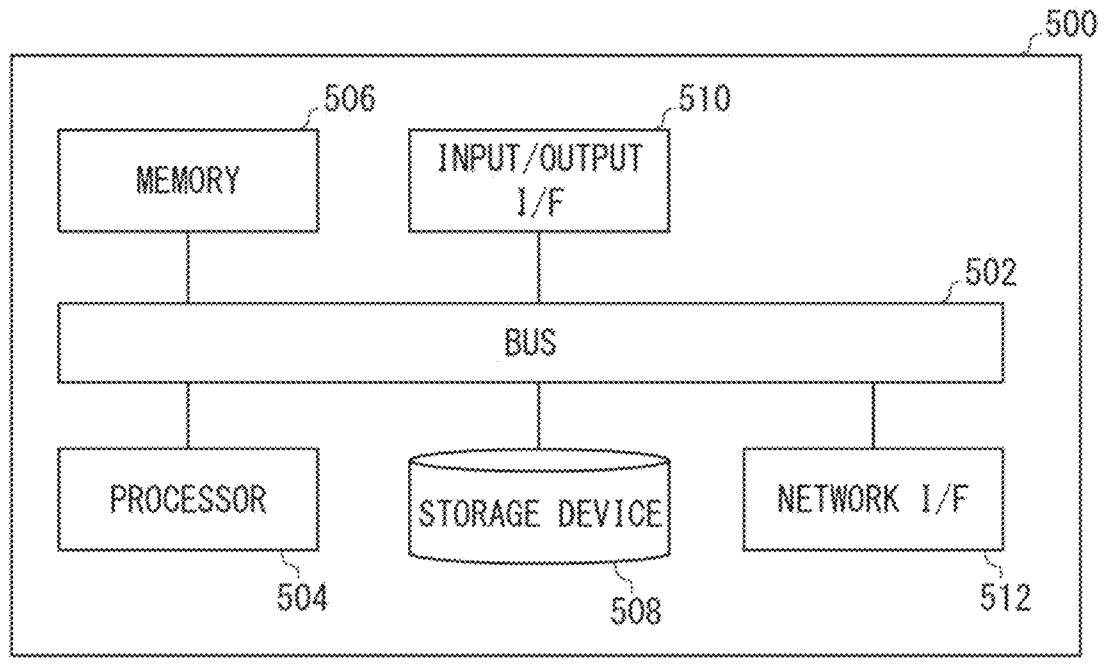
FIG. 14 is a block diagram exemplifying a hardware configuration of a computer.

FIG. 14 is a block diagram illustrating a hardware configuration of a computer. An authentication system in the present disclosure can realize the above-described functions by using a computer 500 having the hardware configuration illustrated in the diagram. The computer 500 may be a portable computer such as a smartphone or a tablet terminal, or may be a stationary computer such as a PC. The computer 500 may be a dedicated computer designed to implement each apparatus, or may be a general-purpose computer. The computer 500 can realize a desired function by installing a predetermined program.

The computer 500 includes a bus 502, a processor 504, a memory 506, a storage device 508, an input/output interface 510 (the interface will also be referred to as an I/F (interface)), and a network interface 512. The bus 502 is a data transmission path for the processor 504, the memory 506, the storage device 508, the input/output interface 510, and the network interface 512 to transmit and receive data to and from each other. However, a method of connecting the processor 504 and the like to each other is not limited to the bus connection.

The processor 504 is various processors such as a CPU, a GPU, or an FPGA. The memory 506 is a primary storage device realized by using a random access memory (RAM) or the like.

The storage device 508 is an auxiliary storage device implemented by using a hard disk, an SSD, a memory card, a read only memory (ROM), or the like. The storage device 508 stores a program for realizing a desired function. The processor 504 reads the program to the memory 506 and executes the program to realize each functional constituent unit of each apparatus.

The input/output interface 510 is an interface connecting the computer 500 and an input/output device. For example, an input device such as a keyboard and an output device such as a display device are connected to the input/output interface 510.

The network interface 512 is an interface connecting the computer 500 to a network.

Although the example of the hardware configuration in the present disclosure has been described above, the above-described example embodiment is not limited thereto. The present disclosure can also be implemented by causing a processor to execute a computer program.

In the above-described example, the program includes a group of instructions (or software code) for causing a computer to execute one or more functions described in the example embodiments when being read by the computer. The program may be stored in a non-transitory computer readable medium or a tangible storage medium. As an example and not by way of limitation, a computer readable medium or tangible storage medium includes a random-access memory (RAM), a read-only memory (ROM), a flash memory, a solid-state drive (SSD) or other memory technology, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer readable medium or a communication medium. As an example and not by way of limitation, transitory computer readable medium or communication medium include electrical, optical, acoustic, or other forms of propagated signals.

Although the invention of the present application has been described above with reference to the example embodiments, the invention of the present application is not limited to the above. Various modifications that can be understood by those skilled in the art can be made to the configuration and details of the invention of the present application within the scope of the invention.

Some or all of the above example embodiments may be described as the following supplementary notes, but are not limited to the following.

Supplementary Note 1

An authentication system including:

authentication means for performing biometric authentication of a person on the basis of a predetermined personal authentication criterion; and condition setting means for setting a group authentication condition for another member in a group to which the person belongs on the basis of attribute information of the authenticated person, in which the authentication means performs authentication of the other member on the basis of the set group authentication condition.

Supplementary Note 2

The authentication system according to Supplementary Note 1, in which the condition setting means specifies whether or not the authenticated person is a representative of the group on the basis of the attribute information, and the authentication means authenticates the other member on the basis of the group authentication condition in a case where the person is the representative, and authenticates the other member on the basis of the personal authentication criterion in a case where the person is not the representative.

Supplementary Note 3

The authentication system according to Supplementary Note 2, further including message output means for outputting a message for prompting authentication of the representative in a case where the authenticated person is not the representative.

Supplementary Note 4

The authentication system according to Supplementary Note 3, in which the authentication means estimates whether an age of the person is less than a predetermined threshold age, and the message output means outputs a message for prompting authentication of the representative in a case where the age of the person estimated by the authentication means is less than the threshold age and the authentication means performs the biometric authentication on the basis of the personal authentication criterion.

Supplementary Note 5

The authentication system according to any one of Supplementary Notes 1 to 4, in which the condition setting means sets the group authentication condition according to an age of the member of the group included in the attribute information.

Supplementary Note 6

The authentication system according to any one of Supplementary Notes 1 to 5, in which the authentication means performs the biometric authentication by using an image of the member or a voice of the member.

Supplementary Note 7

The authentication system according to Supplementary Note 6, in which the authentication means extracts any one of a face image, an iris image, and a fingerprint image from the image of the member as biometric information, and performs the biometric authentication on the basis of the extracted biometric information.

Supplementary Note 8

The authentication system according to any one of Supplementary Notes 1 to 7, further including storage means for storing person information in which authentication information of the person is associated with the attribute information regarding the group to which the person belongs, in which the condition setting means sets the group authentication condition on the basis of the attribute information stored in the storage means.

Supplementary Note 9

The authentication system according to any one of Supplementary Notes 1 to 8, further including update information reception means for receiving predetermined information for updating the group authentication condition.

Supplementary Note 10

The authentication system according to Supplementary Note 9, in which the update information reception means receives a selection operation for performing authentication on the basis of one of the group authentication conditions in a case where the attribute information of the person includes a plurality of different groups.

Supplementary Note 11

The authentication system according to Supplementary Note 9, in which the update information reception means receives registration of the group to which the person belongs.

Supplementary Note 12

The authentication system according to Supplementary Note 9, in which the update information reception means receives history information of a history in which the person is authenticated, and the condition setting means sets the group authentication condition according to the history information.

Supplementary Note 13

The authentication system according to Supplementary Note 12, in which the update information reception means receives a first authentication level as the history information, the first authentication level being an authentication level in a predetermined outward path of the group, and the condition setting means sets a second authentication level of the group in a return path corresponding to the outward path to a level lower than the first authentication level.

Supplementary Note 14

An authentication method of causing a computer to execute:

performing biometric authentication of a person on the basis of a predetermined personal authentication criterion;

setting a group authentication condition for another member in a group to which the person belongs on the basis of attribute information of the authenticated person; and performing authentication of the other member on the basis of the set group authentication condition.

Supplementary Note 15

A non-transitory computer readable medium storing a program for causing a computer to execute an authentication method including:

performing biometric authentication of a person on the basis of a predetermined personal authentication criterion;

setting a group authentication condition for another member in a group to which the person belongs on the basis of attribute information of the authenticated person; and performing authentication of the other member on the basis of the set group authentication condition.

REFERENCE SIGNS LIST

1 AUTHENTICATION SYSTEM
2 AUTHENTICATION SYSTEM
3 AUTHENTICATION SYSTEM
11 AUTHENTICATION UNIT
12 CONDITION SETTING UNIT
13 IMAGE DATA ACQUISITION UNIT
14 COMMUNICATION UNIT
15 MESSAGE OUTPUT UNIT
16 STORAGE UNIT
17 PERSON INFORMATION MANAGEMENT UNIT
18 UPDATE INFORMATION RECEPTION UNIT
30 PERSON INFORMATION MANAGEMENT SYSTEM
31 COMMUNICATION UNIT
32 CONTROL UNIT
33 PERSON INFORMATION MANAGEMENT UNIT
34 PERSON INFORMATION STORAGE UNIT
40 ACCESS CONTROL TERMINAL
41 CAMERA
42 DISPLAY SECTION
43 GATE SECTION
44 ACCESS CONTROL UNIT
111 FEATURE IMAGE EXTRACTION UNIT
112 FEATURE POINT EXTRACTION UNIT
161 AUTHENTICATION INFORMATION
162 PERSON INFORMATION
163 HISTORY INFORMATION
341 PERSON INFORMATION
500 COMPUTER
504 PROCESSOR
506 MEMORY
508 STORAGE DEVICE
510 INPUT/OUTPUT INTERFACE
512 NETWORK INTERFACE
N1 NETWORK

What is claimed is:

1. An authentication system comprising:
a memory configured to store instructions; and
a processor configured to execute the instructions to:
perform biometric authentication of a person on the basis of a predetermined personal authentication criterion;
specify whether or not an authenticated person is a representative of a group on the basis of attribute information of the authenticated person;
in response to specifying the authenticated person is the representative, set a group authentication condition for another member in the group to which the person belongs on the basis of the attribute information so as to set an authentication level of an infant lower than an authentication level of an adult;
perform authentication of the other member on the basis of the set group authentication condition in a case where the authenticated person is specified as the representative; and
perform authentication of the other member on the basis of the personal authentication criterion in a case where the authenticated person is not specified as the representative.

2. The authentication system according to claim 1, wherein the processor is configured to execute the instructions to output a message for prompting authentication of the representative in a case where the authenticated person is not the representative.

3. The authentication system according to claim 1, wherein the processor is configured to execute the instructions to perform the biometric authentication by using an image of the member or a voice of the member.

4. The authentication system according to claim 3, wherein the processor is configured to execute the instructions to extract any one of a face image, an iris image, and a fingerprint image from the image of the member as biometric information, and performs the biometric authentication on the basis of the extracted biometric information.

5. The authentication system according to claim 1,
wherein the processor is configured to execute the instructions to set the group authentication condition on the basis of the attribute information regarding the group to which the person belongs.

6. The authentication system according to claim 1, the processor is configured to execute the instructions to receive predetermined information for updating the group authentication condition.

7. The authentication system according to claim 6, wherein the processor is configured to execute the instructions to receive a selection operation for performing authentication on the basis of one of the group authentication conditions in a case where the attribute information of the person includes a plurality of different groups.

8. The authentication system according to claim 6, wherein the processor is configured to execute the instructions to receive registration of the group to which the person belongs.

9. The authentication system according to claim 6, wherein the processor is configured to execute the instructions to:
receive history information of a history in which the person is authenticated; and
set the group authentication condition according to the history information.

10. The authentication system according to claim 9, wherein the processor is configured to execute the instructions to:
receive a first authentication level as the history information, the first authentication level being an authentication level in a predetermined outward path of the group; and
set a second authentication level of the group in a return path corresponding to the outward path to a level lower than the first authentication level.

11. The authentication system according to claim 1, wherein the processor is configured to execute the instructions to, in response to authenticating the other member, output a signal to an access control terminal to drive a gate section such that the other member can pass through the gate section.

12. The authentication system according to claim 1, wherein the processor is configured to execute the instructions to:
receive image data from a camera of an access control terminal;
extract a feature image related to biometric authentication of the person from the received image data;
extract feature points from the feature image; and
calculate a feature amount from the extracted feature points for use in the biometric authentication.

13. The authentication system according to claim 1, wherein the processor is configured to execute the instructions to:

estimate whether an age of the person is less than a predetermined threshold age; and output a message for prompting authentication of the representative in a case where the estimated age of the person is less than the threshold age and the biometric authentication has been performed on the basis of the personal authentication criterion.

14. An authentication system comprising:

a memory configured to store instructions; and a processor configured to execute the instructions to:

perform biometric authentication of a person on the basis of a predetermined personal authentication criterion;

set a group authentication condition for another member in a group to which the person belongs on the basis of attribute information of the authenticated person;

perform authentication of the other member on the basis of the set group authentication condition;

specify whether or not the authenticated person is a representative of the group on the basis of the attribute information;

authenticate the other member on the basis of the set group authentication condition in a case where the person is the representative;

authenticate the other member on the basis of the personal authentication criterion in a case where the person is not the representative;

output a message for prompting authentication of the representative in a case where the authenticated person is not the representative;

estimate whether an age of the person is less than a predetermined threshold age; and output a message for prompting authentication of the representative in a case where the estimated age of the person is less than the threshold age and the biometric authentication has been performed on the basis of the personal authentication criterion.

15. An authentication method of causing a computer to execute:

performing biometric authentication of a person on the basis of a predetermined personal authentication criterion;

specifying whether or not an authenticated person is a representative of a group on the basis of attribute information of the authenticated person;

in response to specifying the authenticated person is the representative, setting a group authentication condition for another member in the group to which the person belongs on the basis of the attribute information so as to set an authentication level of an infant lower than an authentication level of an adult;

performing authentication of the other member on the basis of the set group authentication condition in a case where the authenticated person is specified as the representative; and performing authentication of the other member on the basis of the personal authentication criterion in a case where the authenticated person is not specified as the representative.

16. The authentication method according to claim 15, further comprising:

estimating whether an age of the person is less than a predetermined threshold age; and outputting a message for prompting authentication of the representative in a case where the estimated age of the person is less than the threshold age and the biometric authentication has been performed on the basis of the personal authentication criterion.

17. A non-transitory computer readable medium storing a program for causing a computer to execute an authentication method comprising:

performing biometric authentication of a person on the basis of a predetermined personal authentication criterion;

specifying whether or not an authenticated person is a representative of a group on the basis of attribute information of the authenticated person;

in response to specifying the authenticated person is the representative, setting a group authentication condition for another member in the group to which the person belongs on the basis of the attribute information so as to set an authentication level of an infant lower than an authentication level of an adult;

performing authentication of the other member on the basis of the set group authentication condition in a case where the authenticated person is specified as the representative; and performing authentication of the other member on the basis of the personal authentication criterion in a case where the authenticated person is not specified as the representative.

18. The non-transitory computer readable medium according to claim 17, wherein the authentication method further comprises:

estimating whether an age of the person is less than a predetermined threshold age; and outputting a message for prompting authentication of the representative in a case where the estimated age of the person is less than the threshold age and the biometric authentication has been performed on the basis of the personal authentication criterion.

19. An authentication method of causing a computer to execute:

performing biometric authentication of a person on the basis of a predetermined personal authentication criterion;

setting a group authentication condition for another member in a group to which the person belongs on the basis of attribute information of the authenticated person;

performing authentication of the other member on the basis of the set group authentication condition;

specifying whether or not the authenticated person is a representative of the group on the basis of the attribute information;

authenticating the other member on the basis of the set group authentication condition in a case where the person is the representative;

authenticating the other member on the basis of the personal authentication criterion in a case where the person is not the representative;

outputting a message for prompting authentication of the representative in a case where the authenticated person is not the representative;

estimating whether an age of the person is less than a predetermined threshold age; and outputting a message for prompting authentication of the representative in a case where the estimated age of the person is less than the threshold age and the biometric authentication has been performed on the basis of the personal authentication criterion.

20. A non-transitory computer readable medium storing a program for causing a computer to execute an authentication method comprising:

performing biometric authentication of a person on the basis of a predetermined personal authentication criterion;

setting a group authentication condition for another member in a group to which the person belongs on the basis of attribute information of the authenticated person;

performing authentication of the other member on the basis of the set group authentication condition;

specifying whether or not the authenticated person is a representative of the group on the basis of the attribute information;

authenticating the other member on the basis of the set group authentication condition in a case where the person is the representative;

authenticating the other member on the basis of the personal authentication criterion in a case where the person is not the representative;

outputting a message for prompting authentication of the representative in a case where the authenticated person is not the representative;

estimating whether an age of the person is less than a predetermined threshold age; and outputting a message for prompting authentication of the representative in a case where the estimated age of the person is less than the threshold age and the biometric authentication has been performed on the basis of the personal authentication criterion.

* * * * *